United States Patent [19]

Franz et al.

[11] Patent Number: 5,738,278
[45] Date of Patent: Apr. 14, 1998

[54] ANCHOR SLEEVE FOR COMPOSITE ANCHORS AND METHOD OF PREPARING CORROSION-RESISTANT ANCHORAGES

[75] Inventors: Popp Franz, Buchloe, Germany; Rudolph Martin, Nüziders, Austria

[73] Assignee: Hilti Aktiengesellschaft, Furstentum, Liechtenstein

[21] Appl. No.: 779,600

[22] Filed: Jan. 7, 1997

[30] Foreign Application Priority Data

Jan. 19, 1996 [DE] Germany ............... 196 01 810.2

[51] Int. Cl.$^6$ ........................................... E01B 9/18
[52] U.S. Cl. ..................... 238/377; 238/265; 411/472
[58] Field of Search ........................... 238/265, 297, 238/298, 377; 411/15, 16, 17, 21, 39, 42, 472

[56] References Cited

U.S. PATENT DOCUMENTS

| | | | |
|---|---|---|---|
| 2,822,986 | 2/1958 | Schreier | 238/377 |
| 3,658,783 | 4/1972 | Hilson | 238/377 |
| 4,179,067 | 12/1979 | Baier | 238/377 |
| 4,917,295 | 4/1990 | Matlock | 238/298 |
| 5,096,118 | 3/1992 | Matlock | 238/298 |
| 5,332,153 | 7/1994 | Leibhard et al. | 238/377 |

*Primary Examiner*—S. Joseph Morano
*Attorney, Agent, or Firm*—Anderson, Kill & Olick, P.C.

[57] ABSTRACT

An anchor sleeve for a composite anchor is threaded in its inside surface and is anchored by at least one of an organic and inorganic mortar in a borehole formed in a concrete tie for rails or in a similar receiving material. The inside threaded sleeve (2) forms a load engagement means for an attachment member and is located in a trailing end region of the sleeve. The sleeve has two concentrically and consecutively arranged sealing elements (7, 9) at an opposite leading end of the sleeve and the sealing elements close off the leading end of the sleeve in a liquid-type manner. The sealing elements (7, 9) can be consecutively displaced out of sealing engagement at the leading end of the sleeve (2). In addition, a method for corrosion resistant anchorages employs the anchor sleeve.

15 Claims, 6 Drawing Sheets

ANCHOR SLEEVE FOR COMPOSITE ANCHORS AND METHOD OF PREPARING CORROSION-RESISTANT ANCHORAGES

BACKGROUND OF THE INVENTION

The present invention is directed to an anchor sleeve for composite or compound anchors, in particular anchor sleeves for use with rail attachments to concrete ties where an axially extending internally threaded sleeve is to be anchored in a bore hole prepared in a concrete tie for rails and similar receiving materials by at least one of an organic and inorganic mortar. The invention is also directed to a method of producing corrosion-resistant anchorages, especially in railroad ties and similar receiving materials for the support of rails for railroad cars where the anchorage is formed of an axially extending sleeve having a leading end and a trailing end and a leading end region extending from the leading end toward the trailing end and the trailing end region extending from the trailing end toward the leading end and an attachment element to be secured in the sleeve.

Frequently, concrete ties are used to support rails for railroad systems, subways and the like. The rails are secured to the concrete ties by attachment elements, as a rule rail bolts. Accordingly, the rail bolts are fixed in anchor sleeves anchored in receiving bores in the concrete ties, generally by using an organic and/or inorganic mortar. Such composite anchor attachments are mainly used in subsequent rehabilitation of rail attachments which over time have more of less corroded. Such rail supports are exposed to the penetration of moisture, such as rain and snow and also water in below ground rail supports, such as in subway systems. The moisture caused by rain, snow and condensation water can accumulate in a receiving bore and lead to rapid corrosion of the screwed-in attachment element. The moisture or water penetrating into the receiving bores freezes during cold weather and there is the possibility that it might cause concrete ties to crack and break up.

SUMMARY OF THE INVENTION

Therefore, the primary object of the present invention is to provide a composite anchor system free of the disadvantages of the systems known in the state of the art. A composite anchor is modified to the extent that the preparation of anchorages is possible which are not sensitive to the penetration of water even when concrete ties are used. A composite anchor and a method of producing corrosion resistant anchorages are to be afforded for use as initial attachments as well as for rehabilitation of corroded attachments.

In accordance with the present invention, an anchor sleeve is provided with sealing elements at its leading end, which can be consecutively displaced from sealing engagement after the anchor has been secured in the borehole by mortar. In addition, the method of providing corrosion resistant anchorages involves the steps of preparing a borehole for the anchor with an drainage bore extending axially inwardly from the base of the borehole. The anchor sleeve with a sealed leading end and a sealing member closing the sealed leading end is placed in the borehole with the sealing member fixed in frictional engagement with the borehole. The anchor sleeve is removed with the sealing member remaining in frictional contact and forming a liquid tight seal at a transition from the borehole to the drainage bore. Injecting at least one of an organic and/or inorganic mortar into the receiving borehole with the sealing element blocking the flow of mortar into the drainage bore. The anchor sleeve is reinserted into the mortar and displaces a sealing base extending transversely of the borehole from the sealing element. After allowing the mortar to harden an object, to be secured to the receiving material, is placed on the tie and the attachment element is inserted through the object and into the sleeve for fixing the attachment element in the anchor sleeve. The attachment element displaces the sealed leading end of the anchor sleeve into the drainage bore and provides for flow through the anchor sleeve into the drainage bore.

The anchor sleeve for the composite anchor is internally threaded and can be fixed or anchored by at least one of an organic and/or inorganic mortar in a prepared receiving borehole in a concrete tie or similar receiving material and the internal thread forms a load engagement means in the sleeve. At its leading end, the anchor sleeve has two concentrically and consecutively arranged sealing elements which maintain the leading end in a liquid tight manner, and the sealing elements can be consecutively displaced out of sealing engagement. Such an anchor sleeve can be secured in a prepared receiving borehole. The special preparation of the receiving borehole involves forming a water drainage bore extending from the base of the borehole in the concrete tie or similar receiving material. The water drainage bore provides for the removal of water which may penetrate in the receiving borehole.

The anchor sleeve is fixed in the borehole by at least one of a flowable organic and/or inorganic mortar. Normally, the mortar would flow out of the base of the receiving borehole into the water drainage bore. Such outflow is prevented by the arrangement of the anchor sleeve of the present invention. By utilizing two concentrically and consecutively arranged sealing elements for sealing the leading end of the borehole in a liquid-type manner, the water drainage bore can be sealed so that the mortar cannot enter such bore. One of the sealing elements prevents the mortar from penetrating into the anchor sleeve which penetration could prevent insertion and securement of the attachment element. The sealing elements are displaced out of sealing engagements consecutively, so that after the composite anchor is set in place, the water drainage bore is opened.

In an advantageous embodiment of the invention, the sealing elements can be formed by a sealing part displaceable out of the leading end of the sleeve and by a cap-shaped sealing part which can be placed on the leading end of the sleeve and which can has a base section which can be displaced out of sealing engagement. The sealing cap provides an outer sealing element closing off the entrance into the water drainage bore against the flow of mortar into the bore. The sealing part of the anchor sleeve is sealingly connected to the leading end of the sleeve and prevents any flow of mortar into the sleeve. The base section of the sealing cap can be displaced out of the leading end region of the anchor sleeve, so that it drops into the water drainage bore. After the mortar has hardened and secured the sleeve, the sealing part in the leading end of the sleeve is displaced into the water drainage bore, whereby a free flow of water or moisture from the anchor sleeve into the bore can take place. Water flowing into the anchor sleeve can be directed into the water drainage bore in this manner. As a result, there is a clear reduction in the risk of corrosion of the attachment element secured in the anchor sleeve.

To facilitate the displacement of the base section of the sealing cap into the water drainage bore by the anchor sleeve, the anchor sleeve has a smaller diameter at its leading end than at its trailing end. Accordingly, the leading end region of the anchor sleeve can be inserted into the prepared borehole and enter the base section where the sealing cap has been displaced, the anchor sleeve can be inserted into the water drainage bore until a transition between the larger diameter and the smaller diameter of the sleeve rests at the base of the borehole in contact with the sealing cap. Preferably, the sealing cap is maintained by a frictional lock with the leading end of the anchor sleeve. In this way it cannot be lost and can be simply inserted into the receiving borehole and can be pushed into the entrance into the water drainage bore.

Since the largest diameter of the sealing part connected to the leading end of the anchor sleeve is smaller than the diameter of the base section of the sealing cap, it is assured that the sealing part drops into the water drainage bore without closing or blocking it.

In an expedient embodiment of the anchor sleeve of the present invention, the sealing part at the leading end of the sleeve is provided with an axially extending projecting part inside the sleeve which extends into the region of the load engagement means. The axially extending projection connected to the sealing part is separated from the leading end of the anchor sleeve at a rated break point. Accordingly, the displacement of the sealing part of the anchor sleeve is effected during the insertion of an attachment element, for instance, when an anchor rod or a threaded bolt is screwed into the sleeve.

The sealing cap has its largest diameter dimensioned so that it can be introduced into the receiving borehole and retained there by frictional engagement without displacement of its base section. The frictional engagement between the wall of the receiving borehole and the sealing cap is stronger than the frictional engagement of the sealing cap with the leading end of the anchor sleeve. In this way it is assured that the sealing cap is displaced from the leading end of the sleeve and remains in position at the entrance into the water drainage bore, when the anchor sleeve is removed from the receiving borehole.

The anchor sleeve as described is intended especially for composite anchors to be anchored in receiving boreholes provided with a water drainage bore extending axially from the borehole base. The anchor sleeve can be used as an initial attachment, however, it can also be used for the rehabilitation of corroded anchorage locations. Preferably, in such a composite anchor, the anchor sleeve is a plastic sleeve provided with an inside thread and the attachment element is a threaded bolt, such as a rail tie bolt.

In the method of the present invention for producing corrosion-resistant anchorages, a composite anchor including an anchor sleeve and an attachment element, preferably detachably engageable in the anchor sleeve, is secured or anchored by means of organic and/or inorganic mortar in a prepared receiving borehole. In accordance with the method, after a receiving borehole is prepared or drilled, a water drainage bore of a smaller diameter is drilled axially inwardly from the borehole base. An anchor sleeve of the present invention is inserted into the receiving borehole up to the base of the borehole at which the mouth or entrance into the water drainage bore is located and the sealing part of the sleeve is located at the base of the borehole. The anchor sleeve is removed or pulled out of the receiving borehole and the sealing cap on the leading end of the sleeve is displaced from the sleeve and closes the entrance to the water drainage bore in a liquid tight manner. The organic and/or inorganic mortar is introduced into the receiving borehole. Next, the anchor sleeve without the sealing cap is completely inserted into the receiving borehole with the base section of the sealing cap being displaced into the water drainage bore. After the mortar hardens, an object to be attached to the tie or receiving material is placed on it and an attachment element is introduced into the anchor sleeve and secured therein, and the sealing part at the leading end of the anchor sleeve is displaced from the sleeve into the open water drainage bore.

The sequence of the method embodying the present invention can be carried out easily and is logical in its course. The required components are kept to a minimum. To close the prepared water drainage bore it is necessary merely to introduce the anchor sleeve with its sealing cap fixed thereon into the receiving borehole and pushed into the entrance or mouth of the water drainage bore. The desired end position is reached when the sealing cap is in contact with the transition between the base of the receiving borehole and the entrance into the water drainage bore which has a smaller diameter. When the anchor sleeve is pulled back out of the receiving borehole, the sealing cap is removed from its leading end and remains at the transition between the borehole and the bore. The mortar introduced into the receiving borehole cannot flow into the water drainage bore because its entrance is closed. When the anchor sleeve is reinserted into the receiving borehole filled with mortar, the base section of the sealing cap is displaced from the remainder of the cap. The water drainage bore is not opened, however, because it is still closed by the anchor sleeve so that the mortar cannot flow out of the receiving borehole into the water drainage bore. Only after the mortar hardens and the attachment element is introduced into the anchor sleeve and secured therein, is the sealing part at the leading end of the anchor sleeve displaced, opening the water drainage bore. The particular advantage of the method embodying the present invention, along with the composite anchor of the present invention, is that the closing and subsequent opening of the water drainage bore occurs without the use of any additional tools, rather only by the components of the composite anchor forming the present invention.

The method of the present invention is particularly suited for producing corrosion-resistant anchorages in concrete ties for securing rails used for railway cars and the like. Mortar seeping into the inside of the anchor sleeve can flow out through the water drainage bore. This reduces the risk of corrosion and prevents the possibility of mortar freezing in the sleeve and causing the concrete tie to break up.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
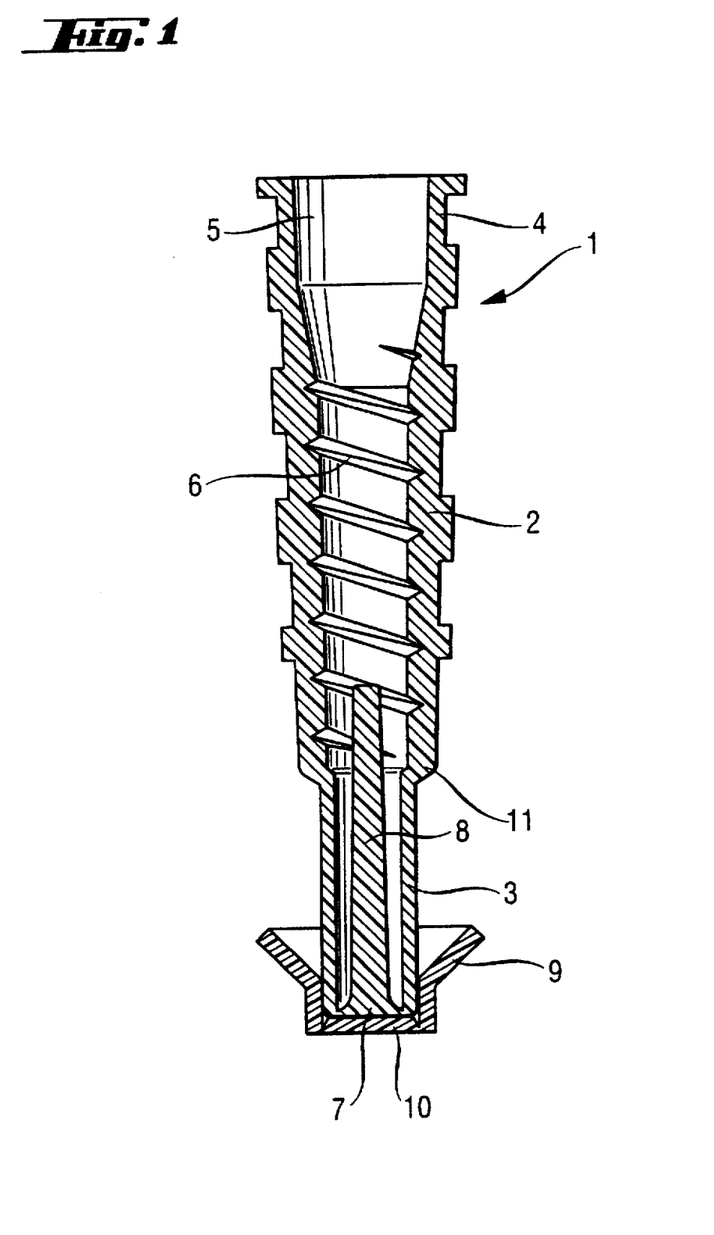
FIG. 1 is an elevational view, in section, of an anchor sleeve embodying the present invention.

In FIG. 1, an axially extending anchor sleeve 1 is shown for use in a composite anchor. The anchor sleeve 1 comprises an internally threaded sleeve 2 having an axially extending through bore 5. The sleeve 2 has a leading end at its lower end in FIG. 1 and a trailing end at its upper end. The sleeve has a leading end region 3 extending from the leading end and a trailing end region 4 extending from the trailing end. The leading end region 3 has a smaller outside diameter than the trailing end region 4. A load engagement means in the form of an internal coarse thread 6 is provided in the trailing end region 4 of the sleeve 2. The trailing end region 4 of the sleeve can be cylindrically shaped, however, it can also be tapered inwardly towards the leading end in a conically shaped manner with the formation of an annular shoulder 11 at the transition from the trailing end region 4 to the leading end region 3. Annular ribs are formed on the outside surface of the trailing end region, not otherwise described in detail, and the ribs assist in securing the sleeve in mortar, injected into the receiving borehole. The leading end region 3 having the smaller diameter is cylindrically shaped, however, it can also be tapered inwardly towards its leading end so that it has a cone-shaped configuration.

Two concentrically arranged sealing elements are arranged at the leading end of the sleeve 2. The sealing elements are formed by a transversely extending sealing part 7 secured in the leading end of the sleeve by an annular rated breakage location. The other sealing element is an inverted capped-shaped element fitted on the leading end of the sleeve and held there by a frictional lock. The sealing cap 9 has a base section 10 extending transversely of the axial direction of the sleeve 2 and providing a closure. The base section 10 can be displaced out of the sealing cap 9. As shown in FIG. 1, the sealing element 7 has an axially extending projection 8 extending into the trailing end region 4. The function of this projection will be explained later in greater detail. The internally threaded sleeve 2 and the sealing elements 7, 10 are preferably formed of a plastics material.

Figure 2:
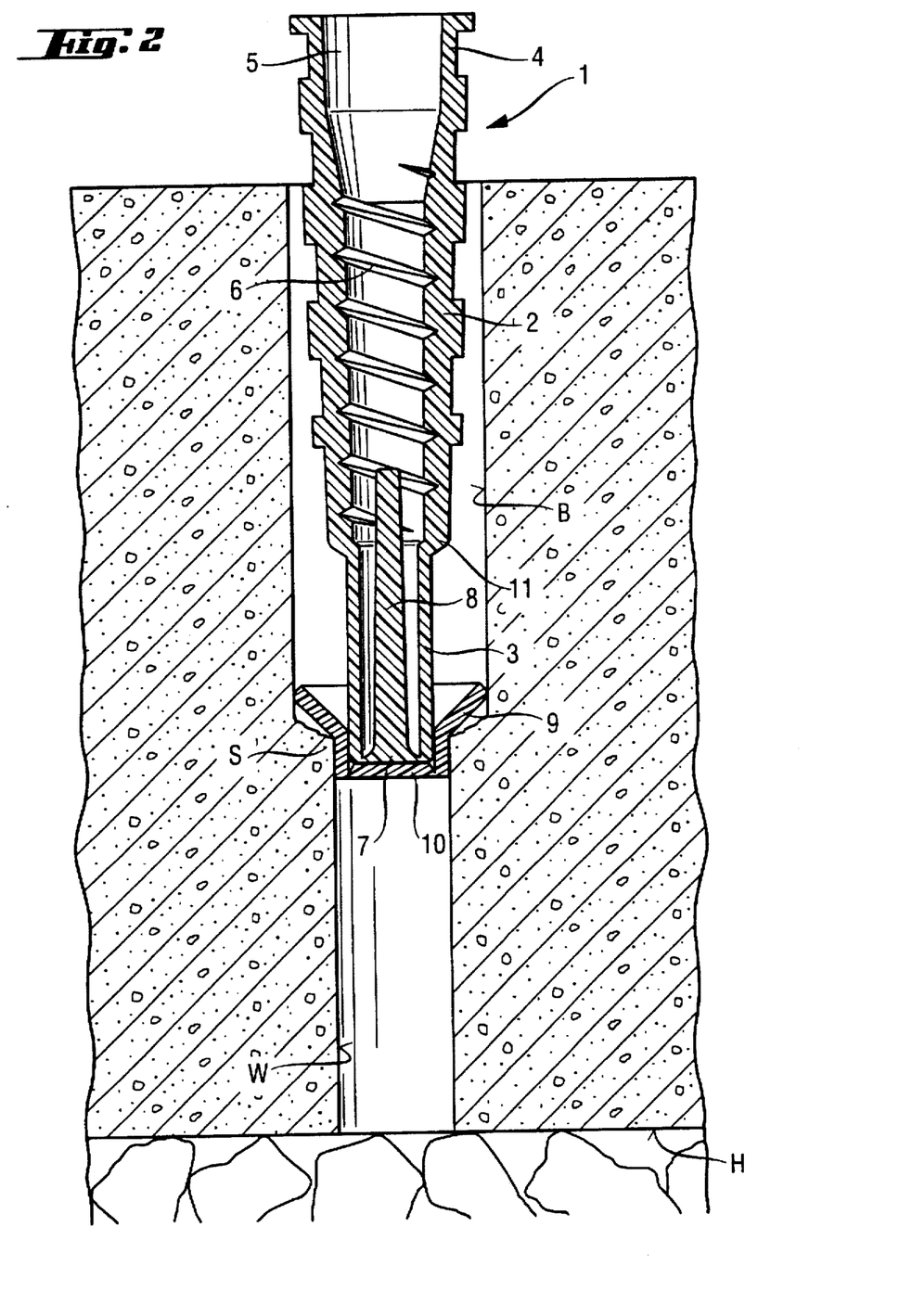
FIG. 2 is an elevational view of the anchor sleeve shown in FIG. 1 inserted into a receiving borehole with a water drainage bore extending downwardly from the base of the receiving borehole.

In FIG. 2 the anchor sleeve 1 is inserted into a prepared receiving borehole B formed in a receiving material G. The receiving material G can be a concrete tie for rails used in a railway system. To prevent an attachment member inserted into a receiving borehole B from corroding and failing due to an accumulation of rainwater or the like in the receiving borehole, the receiving borehole B is provided with an axially extending water draining bore W extending axially inwardly from the base of the receiving borehole towards the rear side H of the concrete tie G. The water drainage bore W has a smaller diameter than the receiving bore B and the borehole and bore are arranged coaxially. At the transition from the borehole B to the drainage bore W a shoulder S is formed acting as a depth stop for the initial introduction of the anchor sleeve 1 into the borehole B. As shown, the anchor sleeve 1 is inserted into the receiving borehole B until the sealing cap 9 bears against the shoulder S.

Figure 3:
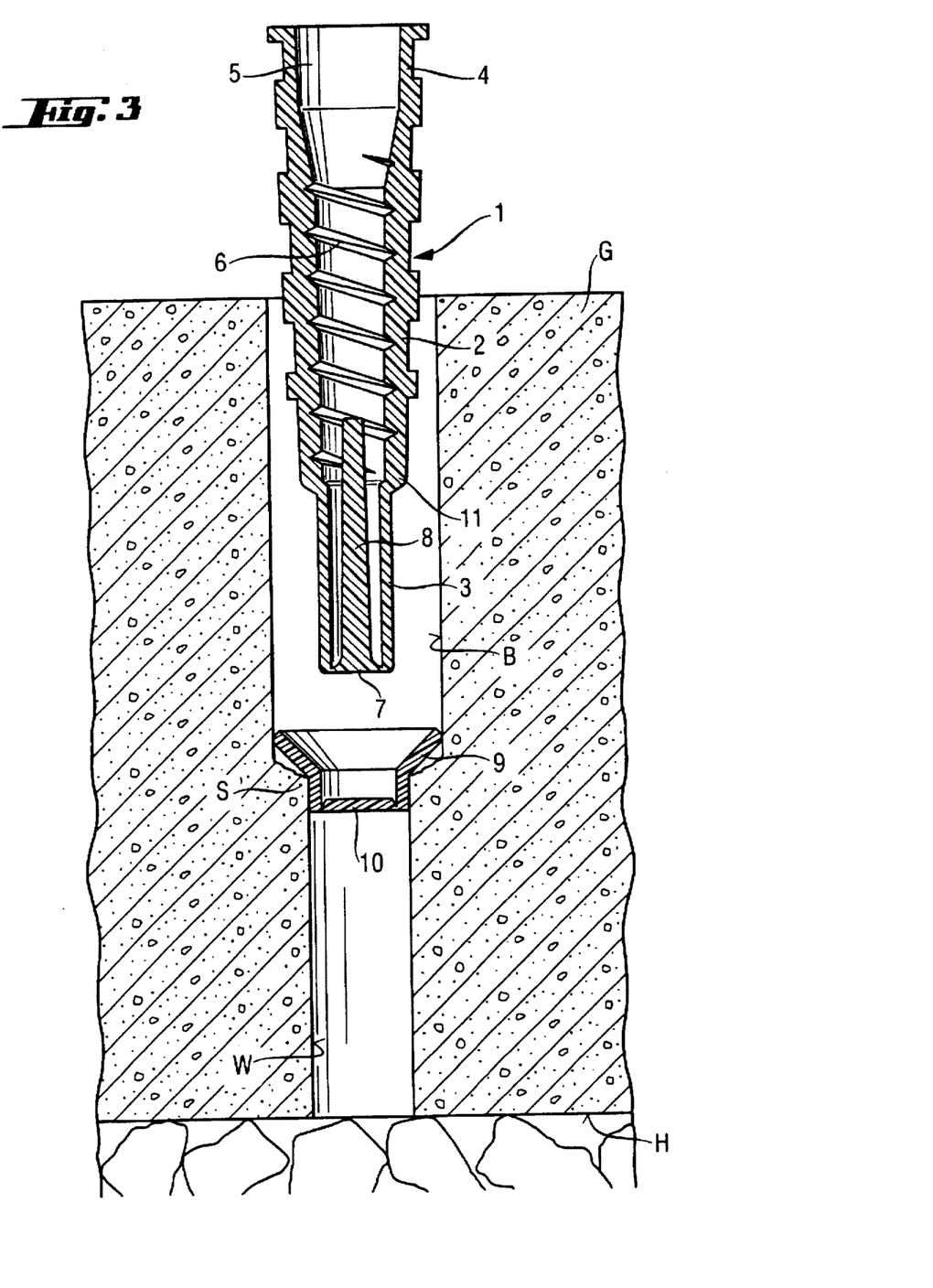
FIG. 3 is a view similar to FIG. 2 with the anchor sleeve being removed from the borehole and with the sealing cap removed from the leading end of the sleeve and retained in the borehole.
Figure 4:
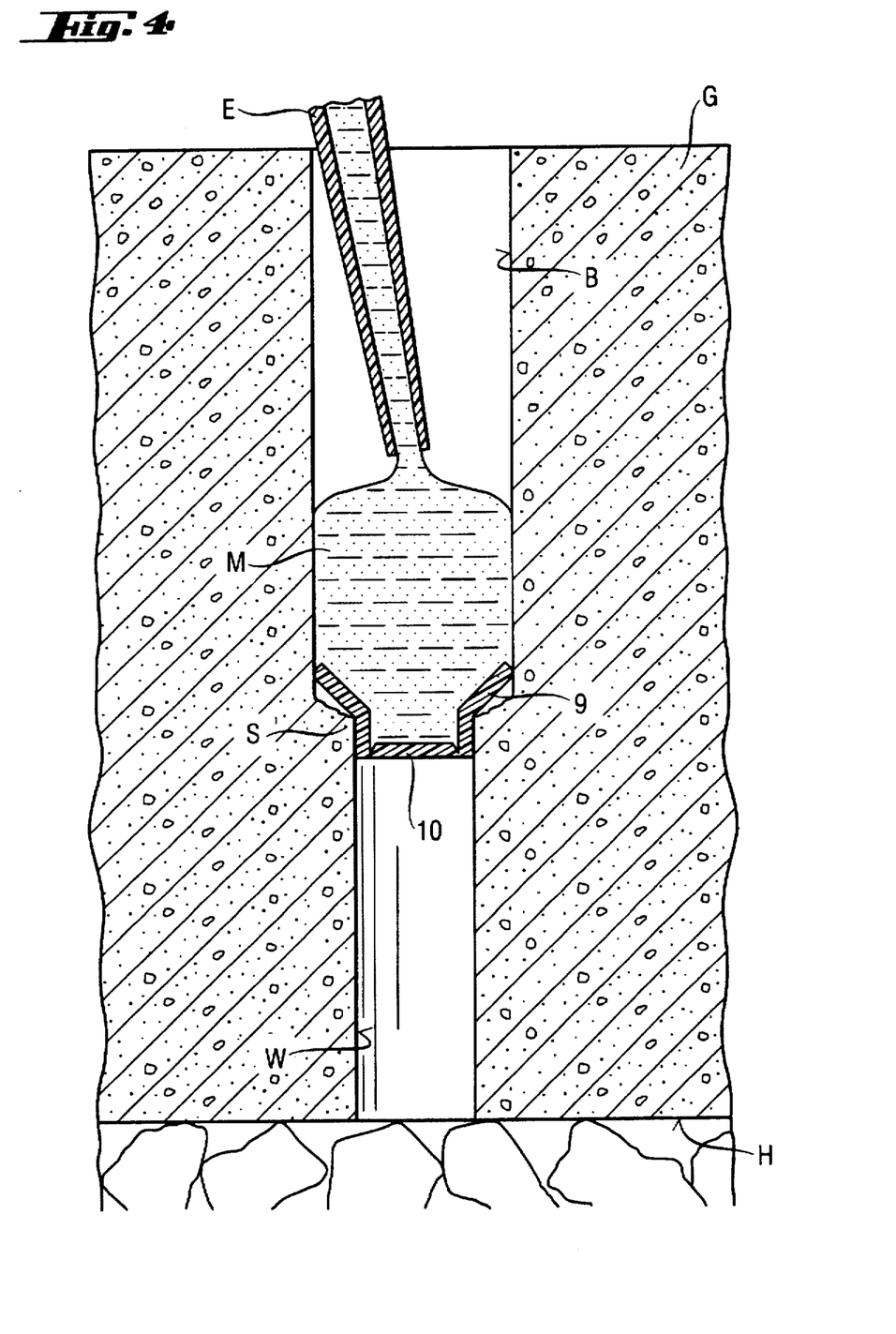
FIG. 4 is a view similar to FIG. 3, however, with the anchor sleeve completely removed, the sealing cap closing off the entrance to the water drainage bore, and with the receiving borehole being filled with mortar.

The sealing cap 9 has its largest diameter at its trailing or upper end as viewed in FIG. 2. This diameter is selected for affording a frictional lock between the surface of the receiving borehole and the sealing cap which is stronger than the frictional lock between the leading end of the sleeve 2 and the sealing cap 9. As a result, it is assured that the sealing cap 9 is separated from the leading end of the sleeve 2 while the sleeve, sealed by the sealing part 7, is pulled out of or removed from the receiving borehole B. The removal step is illustrated in FIG. 3. As can be noted, the sealing cap 9 remains in position at the base of the borehole B and seals the entrance into the water drainage bore W in a fluid type manner. The receiving bore B with the closed water drainage bore W is now ready to be filled with a flowable organic and/or inorganic mortar M as indicated in FIG. 4, where the mortar is injected into the receiving borehole B by a dispensing device with an injection nozzle E. The sealing cap 9 closes the entrance to the water draining bore W and prevents any flow of the mortar from the receiving borehole 9 into the water drainage bore W.

Figure 5:
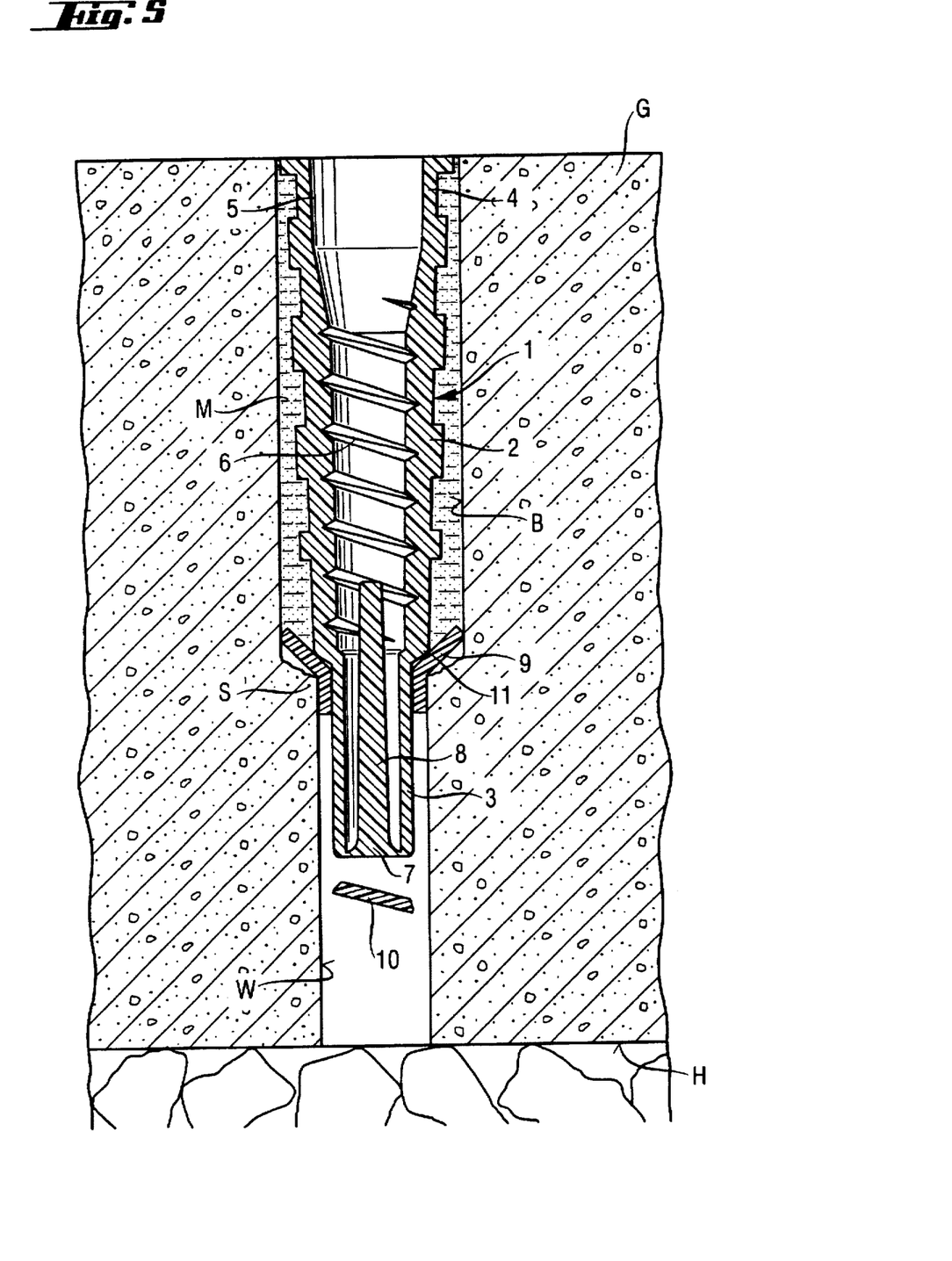
FIG. 5 shows the anchor sleeve of FIGS. 1–3 reinserted into the receiving borehole with a base section of the sealing cap displaced into the water drainage bore.

After the receiving borehole B has been filled with a sufficient amount of mortar M, the internally threaded sleeve 2 is again inserted into the receiving borehole B, as is shown in FIG. 5. The sealing part 7 at the leading end of the leading end region 3 of the sleeve 2 prevents the flow of the mortar M into the bore 5 of the sleeve 2. The sleeve 2 is pushed axially into the receiving borehole B until its leading end displaces the base section 10 of the sealing cap 9 into the water drainage bore W. The outside diameter of the leading end region 3 of the internally threaded sleeve 2 is matched to the diameter of the displaceable sealing part 10 whereby the water drainage bore W is sealed by the sleeve within the sealing cap 9 and mortar M cannot flow out of the borehole B when the base part 10 of the sealing cap 9 is displaced. The shoulder S at the transition between the trailing and leading regions 4, 3 of the sleeve 2 is supported within the sealing cap with the leading end region 3 extending into the water drainage bore W.

Figure 6:
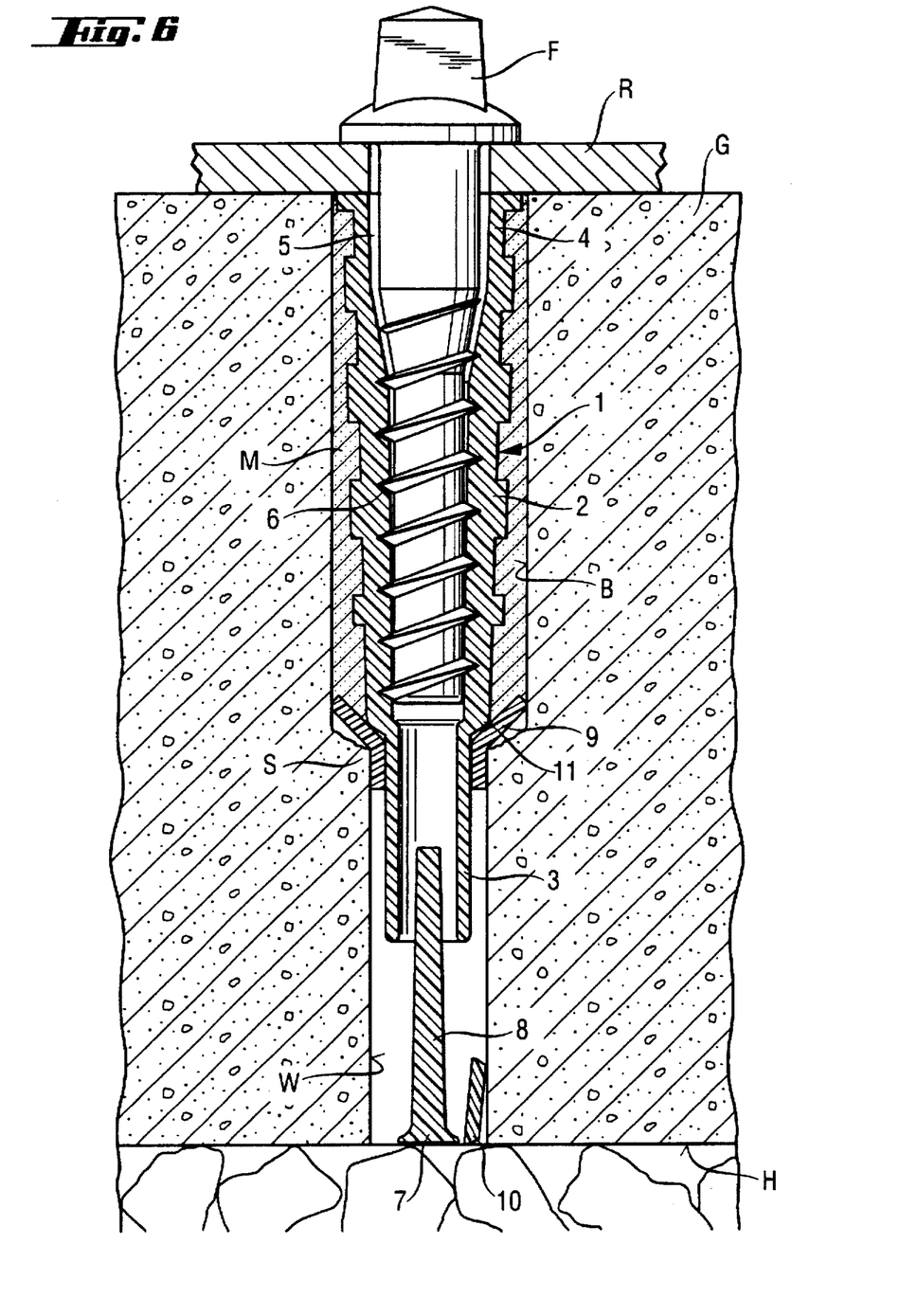
FIG. 6 is similar to FIG. 5, however, an attachment element is threaded into the sleeve and a sealing part of the sleeve is displaced into the water drainage bore.

In FIG. 6 the anchor sleeve 1 of the present invention is shown affixed in the borehole B by the hardened mortar M. The mortar M previously injected into the receiving borehole B has hardened and forms a compound or composite joint with the internally threaded sleeve 2 and the wall surface of the borehole B. To enable a flow of water, such as rainwater, through the sleeve 2 it must be opened at its leading end. Such opening occurs, preferably automatically, as the attachment element F is threaded into the internally threaded sleeve 2 for securing a rail R to the surface of the concrete tie G. The leading end of the attachment element F directed towards the base of the borehole impacts against the trailing end of the projection 8 extending upwardly from the sealing part 7. As the attachment element F is threaded into the sleeve 2, the projection is forced in the direction of the water drainage bore W. As a result, the connection between the leading end of the sleeve and the sealing part 7 is broken. The projection 8 and the sealing part 7, preferably formed as one piece, drops into the water drainage bore and opens the flow from the sleeve into it. Rainwater which may penetrate into the anchor sleeve 1 can now flow out of the sleeve and into the water drainage bore W. The lower end of the bore W is open so that it does not retain water.

The anchor sleeve described above and formed in accordance with the present invention is particularly suited for the composite anchorage of rails to concrete ties for supporting railway cars and the like. The anchorage can be an initial attachment in receiving boreholes with water drainage bores, however, the arrangement can also be used for the subsequent rehabilitation of corroded anchorage locations, where the existing anchorage location is drilled out and the receiving borehole is provided with a water drainage bore extending axially from its base. The water drainage bore permits water that has penetrated into the receiving borehole to flow out. The anchorage of the anchor sleeve is effected by the flowable organic and/or inorganic mortar. Normally the mortar would flow from the receiving borehole into the water drainage bore. Such flow is blocked by the anchor sleeve of the present invention. Since two concentrically and consecutively arranged sealing elements are provided, which close the leading end of the anchor sleeve in a liquid-type manner at the base of the borehole, and since the sealing elements can be consecutively displaced out of sealing engagement, the water drainage bore can initially be sealed off, so that the mortar cannot flow into the water drainage bore. The second sealing element prevents the mortar from flowing into the interior of the anchor sleeve and blocking the introduction and securement of the attachment element. The sealing elements are opened consecutively, so that the water drainage bore is opened when the composite anchor is secured within the borehole.

While specific embodiments of the invention have been shown and described in detail to illustrate the inventive principles, it will be understood that the invention may be embodied otherwise without departing from such principles.

What is claimed is:

1. An anchor sleeve for composite anchors comprising an axially extending internally threaded sleeve (2) to be anchored in a borehole (B) prepared in a concrete tie for rails and similar receiving materials by at least one of an organic and inorganic mortar (M), said sleeve (2) having a leading end inserted first into the borehole and a trailing end with an axially extending trailing end region extending from the trailing end and an axially extending leading end region extending from the leading end, said sleeve (2) has two concentrically and consecutively arranged sealing elements (7, 9) sealing the leading end, and said sealing elements (7, 9) being arranged for consecutive displacement from said leading end.

2. An anchor sleeve, as set forth in claim 1, wherein said sealing elements (7, 9) comprise a sealing part (7) secured in the leading end of said sleeve (2) and the other sealing element comprises a cup-shaped sealing cap (9) fitted on and laterally enclosing the leading end of said sleeve 2, and said sealing cap (9) having a base section extending transversely of the axial direction of said sleeve and fitted against the leading end of said sleeve.

3. An anchor sleeve, as set forth in claim 2, wherein said internally threaded sleeve (2) has a smaller outside diameter in the leading end region (3) than in the trailing end region (4), and said sealing cap (9) being retained by a frictional lock with a circumferentially extending surface at the leading end of the leading end region 3 of the internally threaded sleeve (2).

4. An anchor sleeve, as set forth in claim 2, wherein said sealing part (7) connected to the leading end of said internally threaded sleeve (2) is smaller than a diameter of the base section (10) of said sealing cap (9).

5. An anchor sleeve, as set forth in claim 4, wherein said sealing part (7) of said sleeve (2) has a unitary projection extending axially within said sleeve from said sealing part (7) towards said trailing end region (4).

6. An anchor sleeve, as set forth in claim 2 or 3, wherein said sealing cap (9) has a largest diameter dimension so that it can be introduced into the borehole (B) without displacing said base section (10) thereof and being retained within said borehole by a frictional lock, and the frictional lock between a surface of the borehole (B) and said sealing cap (9) is stronger than a frictional lock between said sealing cap (9) and the leading end of said internally threaded sleeve (2).

7. Composite anchor to be secured in an axially extending receiving borehole (B) having a base and an axially extending water drainage bore extending axially from the base of said borehole, comprising an anchor sleeve comprising an axially extending internally threaded sleeve (2) to be anchored in the borehole (B) by at least one of an organic and inorganic mortar (M), said sleeve (2) having a leading end inserted first into the borehole and a trailing end with an axially extending trailing end region extending from the trailing end and an axially extending leading end region extending from the leading end, said sleeve having two concentrically and consecutively arranged sealing elements (7, 9) sealing the leading end thereof, and said sealing elements (7, 9) arranged for consecutive displacement from said leading end.

8. Composite anchor, as set forth in claim 7, wherein said sleeve (2) is a plastic sleeve and an attachment element (F) is a tie bolt engageable in said sleeve (2) for securing a rail.

9. Composite anchor, as set forth in claim 7, wherein said sealing elements (7, 9) comprise a sealing part (7) secured in the leading end of said sleeve (2) and the other sealing element comprising a cup-shaped sealing cap (9) fitted on and laterally enclosing the leading end of said sleeve (2) and said sealing cap (9) having a base section (10) extending transversely of the axial direction of said sleeve and fitted against the leading end of said sleeve.

10. Composite anchor, as set forth in claim 9, wherein said internally threaded sleeve (2) has a smaller outside diameter in the leading end region (3) than in the trailing end region (4), and said sealing cap (9) being retained by a frictional lock with a circumferentially extending surface at the leading end of the leading end region (3) of the internally threaded sleeve (2).

11. Composite anchor, as set forth in claim 9 or 10, wherein said sealing part (7) connected to the leading end of said internally threaded sleeve (2) has a smaller diameter than a diameter of the base section (10) of said sealing cap (9).

12. Composite anchor, as set forth in claim 11, wherein said sealing part (7) of said sleeve (2) has a unitary projection extending axially from said sealing part (7) towards said trailing end region (4) within said sleeve.

13. Composite anchor, as set forth in claim 9 or 10, wherein said sealing cap (9) has a largest diameter dimensioned so that it can be introduced into the receiving borehole (B) without displacing said base section (10) thereof and being retained within said borehole by a frictional lock, and the frictional lock between a surface of the receiving borehole (B) and said sealing cap (9) is stronger than the frictional lock between said sealing cap (9) and the leading end of said internally threaded sleeve (2).

14. Method of producing corrosion resistant anchorages where the anchorage comprises an axially extending sleeve with an internal thread and having a leading end and a trailing end, a leading end region extending from the leading end towards the trailing end and a trailing end region extending from the trailing end towards the leading end and an attachment member to be secured in threaded engagement within said sleeve, the method comprising the steps of preparing an axially extending borehole (B) having a first diameter in a receiving material with the borehole having a base, preparing an axially extending drainage bore (W) with a second diameter smaller than the first diameter of said borehole (B) and extending axially from the base of the borehole (B), inserting the axially extending anchor sleeve (2) with a sealed said leading end and with a sealing member enclosing the sealed leading end into the borehole (B) whereby the sealed leading end and the sealing member is located at the base of the borehole with the sealing member in frictional engagement with the borehole, withdrawing the anchor sleeve (2) from the borehole (B) with the sealing member (9) remaining in frictional engagement with the borehole and forming a liquid-type seal at a transition from the borehole to the drainage bore, injecting at least one of an organic and inorganic mortar (M) into the receiving borehole (B) with the sealing element (9) blocking flow of the mortar into the drainage bore, inserting the anchor sleeve (2) back into the mortar before the mortar sets and displacing a sealing base (10) extending transversely of the borehole from the sealing member (9) into the drainage bore, allowing the mortar to harden and set and placing an object (R) to be secured to the receiving material on the receiving material and inserting an attachment element (F) through the object (R) and fixing the attachment element within the anchor sleeve and employing the attachment element for displacing the sealed leading end out of the leading end of the anchor sleeve into the drainage bore and thereby providing for flow of liquid through the anchor sleeve into the drainage bore.

15. Method, as set forth in claim 14, wherein said receiving material is a concrete tie for rails with the receiving borehole (B) extending into said concrete tie from one surface thereof and said drainage bore extending from the base of the receiving borehole to an opposite surface of said concrete tie.

* * * * *